US007584573B2

(12) United States Patent
Yoshii et al.

(10) Patent No.: US 7,584,573 B2
(45) Date of Patent: Sep. 8, 2009

(54) GLASS FIXING GROMMET

(75) Inventors: Hiroyuki Yoshii, Hiroshima (JP); Shigeharu Yokoyama, Hiroshima-ken (JP); Tomohiro Kajiyama, Hiroshima-ken (JP)

(73) Assignees: Nifco Inc., Yokohama (JP); Mazda Motor Corporation, Hiroshima-ken (JP)

( * ) Notice: Subject to any disclaimer, the term of this patent is extended or adjusted under 35 U.S.C. 154(b) by 998 days.

(21) Appl. No.: 10/944,857

(22) Filed: Sep. 21, 2004

(65) Prior Publication Data

US 2005/0072077 A1 Apr. 7, 2005

(30) Foreign Application Priority Data

Sep. 22, 2003 (JP) ............................ 2003-330443

(51) Int. Cl.
*B60J 1/16* (2006.01)
*E05F 11/38* (2006.01)

(52) U.S. Cl. ............................ 49/375; 49/374; 49/372

(58) Field of Classification Search .................. 49/374, 49/375, 372
See application file for complete search history.

(56) References Cited

U.S. PATENT DOCUMENTS

| | | | | |
|---|---|---|---|---|
| 3,653,157 | A * | 4/1972 | Casebolt | 49/411 |
| 4,464,091 | A * | 8/1984 | Molina | 411/105 |
| 4,530,186 | A * | 7/1985 | Guillon | 49/441 |
| 4,829,711 | A * | 5/1989 | Sambor | 49/211 |
| 4,848,032 | A * | 7/1989 | Ballor et al. | 49/350 |
| 5,363,595 | A * | 11/1994 | Wirsing | 49/375 |
| 5,502,926 | A * | 4/1996 | Grace et al. | 49/375 |
| 5,537,783 | A * | 7/1996 | Kazino et al. | 49/375 |
| 5,546,704 | A * | 8/1996 | Maruoka | 49/375 |
| 5,599,148 | A * | 2/1997 | Hirose | 411/175 |
| 5,729,930 | A * | 3/1998 | Schust et al. | 49/375 |
| 5,778,599 | A * | 7/1998 | Saito | 49/375 |
| 5,966,872 | A * | 10/1999 | Wasek et al. | 49/375 |
| 6,152,636 | A * | 11/2000 | Nass | 403/13 |
| 6,453,617 | B1 * | 9/2002 | Klippert et al. | 49/375 |
| 2001/0023562 | A1 | 9/2001 | Blobaum et al. | |
| 2003/0110702 | A1 * | 6/2003 | Capriotti et al. | 49/375 |

FOREIGN PATENT DOCUMENTS

| | | |
|---|---|---|
| DE | 196 36 165 | 3/1997 |
| JP | 3285987 | 3/2002 |
| JP | 2005097878 A * | 4/2005 |

* cited by examiner

*Primary Examiner*—Ryan D Kwiecinski
(74) *Attorney, Agent, or Firm*—Manabu Kenesaka

(57) ABSTRACT

A glass fixing grommet fixes a glass with a hole to a mount and includes first and second supporting plates. The first supporting plate is attached on one surface of the glass and has a first cylinder portion with a bolt inserting hole for inserting a bolt therein. The second supporting plate is attached on the other surface of the glass to face the first supporting plate. The second supporting plate includes a second cylinder portion to be fitted with the first cylinder portion with a bolt exit, and a nut holding member situated adjacent to the bolt exit for holding a nut thereat. When the first and second supporting plates sandwich the glass, the bolt passes through the mount and the first and second supporting plates to engages the nut to fix the glass to the mount.

11 Claims, 18 Drawing Sheets

GLASS FIXING GROMMET

BACKGROUND OF THE INVENTION AND RELATED ART STATEMENT

The present invention relates to a glass fixing grommet to be used when a window glass is attached to a mount.

When a window glass is attached to a mount such as a window glass elevating mechanism, a glass fixing grommet has generally been used as disclosed in Japanese Patent No. 3285987. The glass fixing grommet includes a first supporting plate to be attached on one surface of a window glass peripheral edge portion having a hole and a second supporting plate to be attached on the other surface of the window glass peripheral edge portion to face the first supporting plate. The first supporting plate includes one of inner and outer cylinders to be fitted into each other. The second supporting plate includes the other of the inner and outer cylinders.

When the first supporting plate and the second supporting plate face each other and hold the glass peripheral edge portion, both cylinders fit into each other in the hole at the window glass peripheral edge portion. In the state that the cylinders are fitted together, a stopper is inserted into the cylinders in the fitted state for connecting the first and second supporting plates holding the window glass peripheral edge portion to the elevating mechanism (mount) to thereby stride over the first and second supporting plates.

The glass fixing grommet is attached to the window glass as described above. The glass fixing grommet is also connected to the elevating mechanism through the stopper. With this structure, the window glass moves vertically through an operation of the elevating mechanism to thereby open or close a window opening.

In the glass fixing grommet described above, a tapping screw is used as the stopper. The tapping screw is directly screwed in the second supporting plate. Accordingly, the tapping screw may be loosened and the glass attached to the elevating mechanism becomes unstable. Further, it is difficult to repeatedly use the glass fixing grommet.

In view of the problems described above, the present invention has been made, and an object of the invention is to provide a glass fixing grommet for stably holding a window glass attached to a mount for a long period and capable of repeated use.

Further objects and advantages of the invention will be apparent from the following description of the invention.

SUMMARY OF THE INVENTION

In order to attain the objects described above, according to a first aspect of the present invention, a glass fixing grommet includes a first supporting plate to be attached on one surface of a window glass peripheral edge portion having a hole and a second supporting plate to be attached on the other surface of the window glass peripheral edge portion to face the first supporting plate. The first supporting plate includes one of inner and outer cylinders to be fitted into each other. The second supporting plate includes the other of the inner and outer cylinders. When the first supporting plate and the second supporting plate face each other and hold the window glass peripheral edge portion therebetween, the cylinders are fitted into each other and inserted in the hole at the window glass peripheral edge portion. In the fitted state of the cylinders, a stopper for connecting the first and second supporting plates holding the window glass peripheral edge portion to a mount is inserted into the cylinders to thereby stride over the first and second supporting plates.

According to the first aspect of the present invention, the first supporting plate is provided with a bolt entering hole for inserting a bolt into the one cylinder. The second supporting plate is provided with a bolt exit for projecting the bolt outwardly through the other cylinder. The second supporting plate also holds a nut member for screwing the bolt, and a female screw hole of the nut member faces the bolt exit of the second supporting plate.

In the first aspect of the invention, the first supporting plate is provided with the bolt entering hole for inserting the bolt into the one cylinder. The second supporting plate is provided with the bolt exit for projecting the bolt outwardly through the other cylinder. The second supporting plate holds the nut member, and the female screw hole of the nut member faces the bolt exit. The bolt is used as a stopper for connecting the first and second supporting plates to the mount. That is, the bolt is screwed in the nut member through the bolt entering hole and the bolt exit. Accordingly, the first and second supporting plates hold the peripheral edge portion of the window glass, and the window glass is precisely attached to the mount. In this case, it is possible to strongly tighten the bolt into the nut member as compared with a case where a tapping screw is directly screwed in the second supporting plate. Therefore, with the glass fixing grommet of the present invention, it is possible to stably hold the window glass attached to the mount for a long period of time. Further, the bolt is detachable from the nut member, thereby making it possible to repeatedly use the glass fixing grommet.

According to a second aspect of the invention, the first and second supporting plates are rotatably connected with a connecting plate. When the first and second supporting plates face each other, it is possible to relatively rotate the first and second supporting plates with a space therebetween by a length of the connecting plate. Accordingly, when the first and second supporting plates are connected through the connecting plate, it is possible to provide a space between the first and second supporting plates for receiving the peripheral edge portion of the window glass.

Further, in the second aspect of the invention, the nut member is held by the second supporting plate so that a posture thereof can be changed with respect to the second supporting plate. When the first and second supporting plates hold the peripheral edge portion of the window glass, even if the first and second supporting plates are not aligned in parallel due to a thickness variation of the window glass, it is possible to change the posture of the nut member with respect to the second supporting plate portion, so that the bolt is smoothly screwed in the nut member while an axial center of the female screw hole of the nut member is aligned to an axial center of the bolt. As a result, when the first and second supporting plates hold the window glass therebetween, the glass fixing grommet is flexibly applied to a window glass with a different thickness.

According to a third aspect of the invention, the first and second supporting plates are provided with engaging pieces for engaging with each other in a state that one of the cylinders is fitted in the other of the cylinders to regulate a space between the first and second supporting plates. Accordingly, when the engaging pieces engage with each other, even if the axial center of the female screw hole of the nut member is inclined with respect to the axial center of the bolt, it is possible to change the posture of the nut member to a desired one from the fitting viewpoint through a pushing force of the bolt when the bolt is screwed in the nut member. Therefore, when the bolt is pressed against the female screw hole of the nut member, it is possible to smoothly screw the bolt in the nut member until completion.

According to a fourth aspect of the invention, the second supporting plate is formed of an inner plate and an outer plate facing the inner plate to form a receiving space therebetween. The nut member is disposed in the receiving space, and a deformable supporting member is disposed between the nut member and the outer plate. Accordingly, it is possible to precisely hold the nut member in the receiving space with the deformable supporting member. Even if the window glass has a thickness smaller than usual and the second and first supporting plates hold the window glass peripheral edge portion in a state that the second supporting plate is inclined toward the first supporting plate, the deformable supporting member is deformed by the pressing force of the bolt with respect to the nut member, so that the nut member is maintained in a desired posture and the bolt is precisely screwed in the nut member.

According to a fifth aspect of the invention, the nut member is formed of an annular plate portion and a cylindrical portion connected to a central hole peripheral edge portion of the annular plate portion and having a female screw on an inner peripheral surface thereof. The annular plate portion is disposed in the receiving space, and the cylindrical portion passes through the outer plate in a loosely fitted state. Accordingly, it is possible to precisely hold the nut member in the receiving space with the annular plate portion and the deformable supporting member. Further, when the bolt is screwed in the nut member, it is possible to maintain the nut member in the desired posture from the fitting viewpoint and secure a sufficient length for screwing the bolt in the nut member with the cylindrical portion.

According to a sixth aspect of the invention, an inserting port is formed between the inner plate and the outer plate for inserting the annular plate portion of the nut member into the receiving space. The outer plate is provided with a notch for allowing the cylindrical portion of the nut member to move when the annular plate portion is inserted into the receiving space. Accordingly, it is possible to slide and retain the annular plate portion of the nut member in the receiving space, so that the nut member can be easily received in the receiving space.

According to a seventh aspect of the invention, the engaging pieces of the first and second supporting plates engage each other in a state that the one cylinder is fitted in the other cylinder and the first and second supporting plates are aligned in parallel. In the engaging state, when the bolt is screwed in the nut member, the bolt pushes the nut member to align the first and second supporting plates in parallel, so that the bolt is smoothly screwed in the nut member. Even if the window glass has a thickness smaller than a distance between the first and second supporting plates (length of the connecting plate), the first and second supporting plates hold the window glass in a state that the second supporting plate is inclined toward the first supporting plate. The deformable supporting member is deformed by the pushing force of the bolt with respect to the nut member, so that the nut member is maintained in the desired posture and the bolt is precisely screwed in the nut member.

According to an eighth aspect of the invention, a part of a cylindrical wall of the outer cylinder is formed of a movable piece. An inner surface of the movable piece is inclined to enter an entering area of the inner cylinder toward a side of the supporting plate of the outer cylinder. Accordingly, it is possible to precisely insert the inner and outer cylinders in the hole of the window glass regardless of a variation in the hole when the inner and outer cylinders are fitted in, so that the glass fitting grommet is firmly integrated with the window glass.

According to a ninth aspect of the invention, a depressed portion is formed in at least one of the first and second supporting plates for allowing the hole peripheral edge portion of the window glass not to contact in a state that the window glass is held. Accordingly, when the first and second supporting plates hold the window glass, the force by the first and second supporting plates is not directly applied to the peripheral edge portion of the hole of the window glass, thereby preventing the window glass from being broken.

According to a tenth aspect of the invention, an elastic piece is provided to an inner side of at least one of the first and second supporting plates for abutting against the window glass. Accordingly, even if the window glass has a thickness smaller than a distance between the first and second supporting plates (length of the connecting plate) and the first and second supporting plates hold the window glass in a state that the second supporting plate is inclined toward the first supporting plate, it is possible to precisely hold the window glass with the elastic piece.

DETAILED DESCRIPTION OF PREFERRED EMBODIMENTS

Hereunder, embodiments of the present invention will be described with reference to the accompanying drawings.

Figure 1:
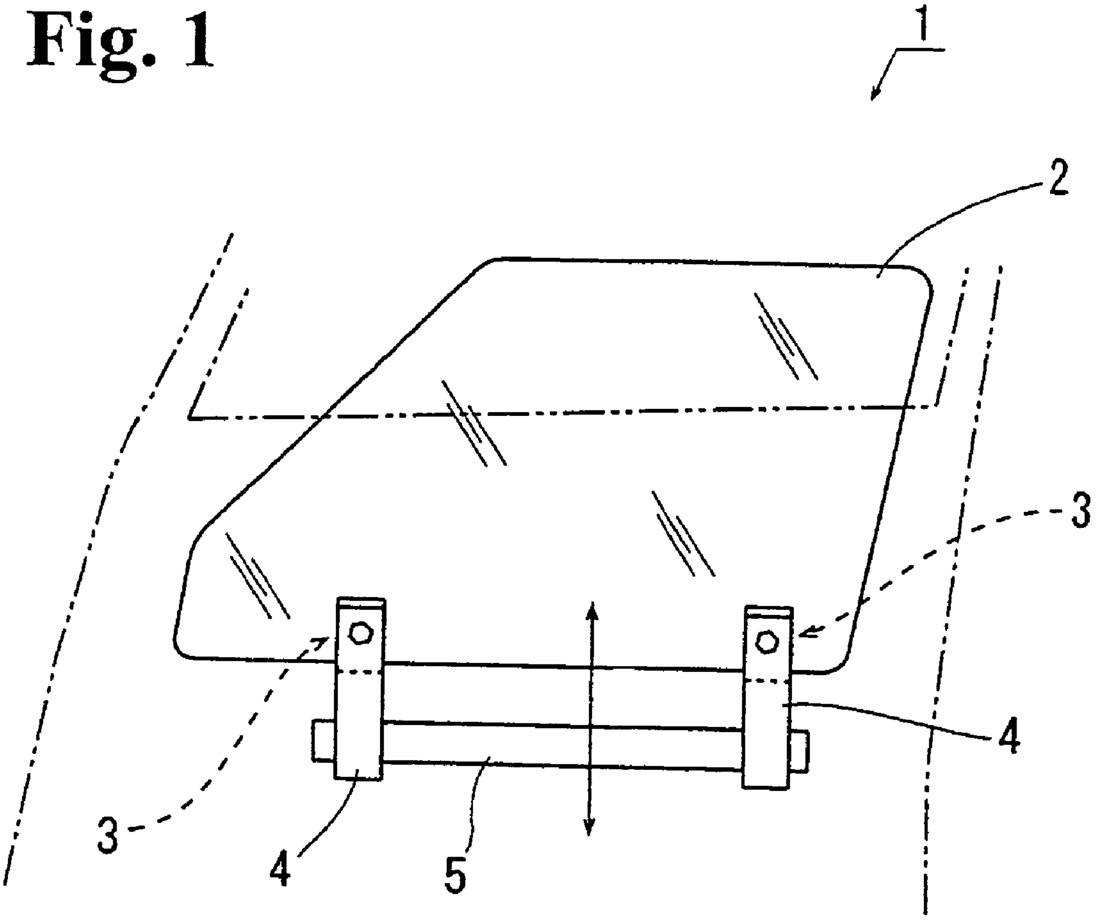
FIG. 1 is an explanatory view showing a grommet applied to an automobile door according to a first embodiment of the present invention.

In FIG. 1, reference numeral 1 denotes a side door of an automobile, and the side door 1 is provided with a widow glass 2. Carrying plates or mounts 4 are attached to lower portions of the window glass 2 at two positions, i.e. front and rear positions thereof, through glass fixing grommets 3 according to an embodiment of the present invention. The carrying plates 4 are connected to an elevating table 5 constituting a portion of an elevating mechanism (hereinafter, reference numeral 5 is used to indicate the elevating mechanism). The window glass 2 moves in the vertical direction with the elevating mechanism 5.

Figure 2:
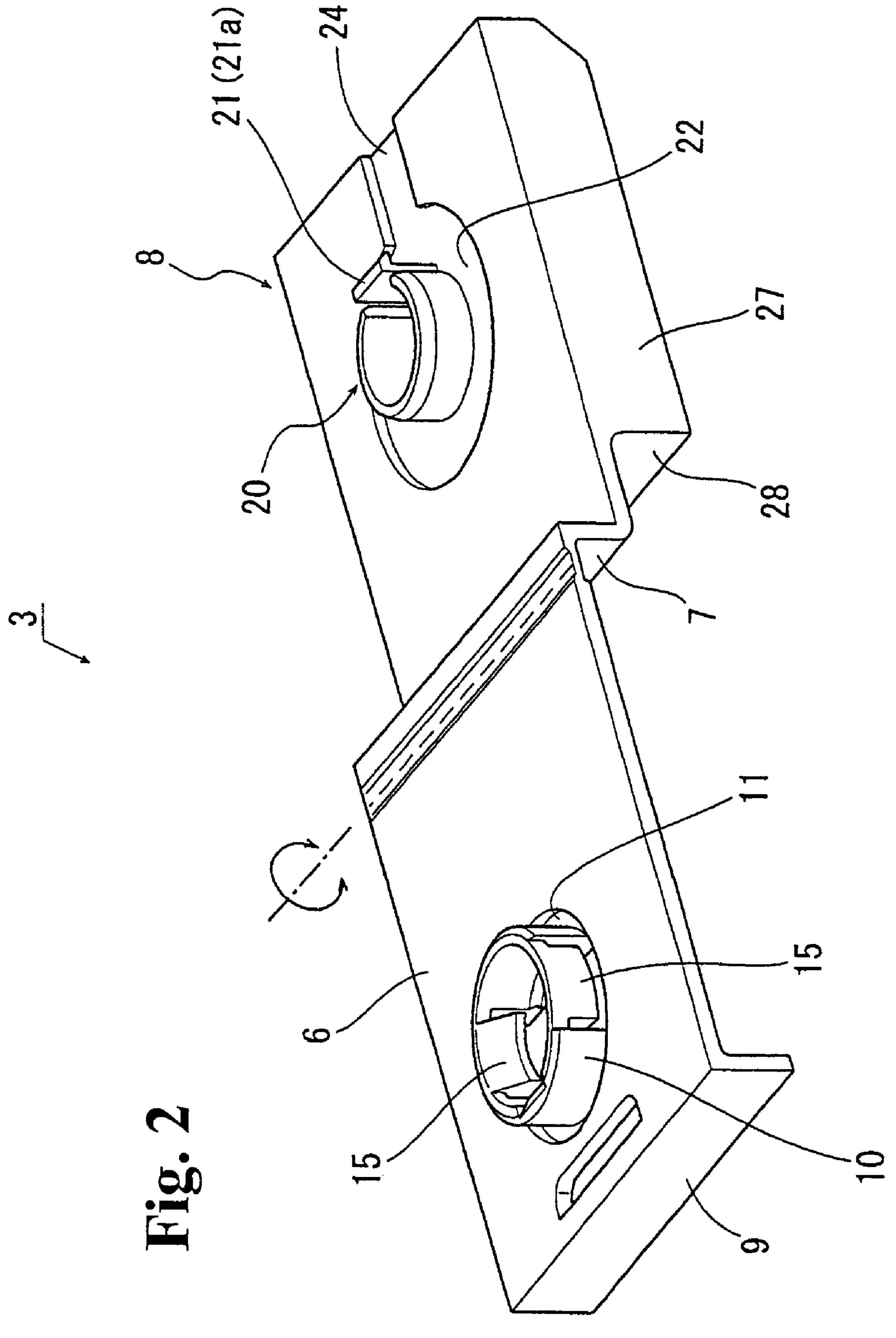
FIG. 2 is a perspective view of the grommet according to the first embodiment.

In the present embodiment, as shown in FIG. 2, the glass fixing grommet 3 includes a first supporting plate portion 6 as a first supporting plate, a connecting plate portion 7 as a connecting plate, and a second supporting plate portion 8 as a second supporting plate, as main components thereof. These portions are continuously integrated with a same width and are formed of a synthetic resin. The first supporting plate portion 6 and the connecting plate portion 7 are integrated to be rotatable with a thin connecting portion therebetween. The connecting plate portion 7 is integrated with the second supporting plate portion 8 in a state that a plate surface of the connecting plate portion 7 stands up with respect to a plate surface of the second supporting plate portion 8.

As shown in FIGS. 2 to 8, the first supporting plate portion 6 is formed of a rectangular plate piece. A length of the first supporting plate portion, 6 in the longitudinal direction (horizontal direction, in FIG. 3) is determined from a viewpoint for holding a lower portion of the window glass 2 as an article to be attached. The length is set to be greater than a distance from a hole (attaching hole) 12 formed in the lower portion of the widow glass 2 to a lower edge of the window glass 2 (refer to FIG. 9).

The first supporting plate portion 6 is provided with a bent portion 9, an outer cylinder (one cylinder) 10, and an annular depressed portion 11 at an end thereof in a longitudinal direction. The bent portion 9 is connected to the first supporting plate portion 6 in a state that the bent portion 9 bends outwardly at a right angle at the end of the first supporting plate portion 6 in the longitudinal direction. The bent portion 9 holds an upper end surface of the carrying plate 4 when the grommet 3 is used.

The outer cylinder 10 with a circular cylindrical shape is integrated with the first supporting plate portion 6 and projects from an inner surface of the first supporting plate portion 6. The outer cylinder 10 is provided at a position corresponding to the hole 12 at the lower portion of the widow glass 2 for attaching the grommet 3 to the window glass 2. The outer cylinder 10 has a size to be fitted into the hole 12 at the lower portion of the window glass 2. The outer cylinder 10 has a projecting end surface opened outwardly and a base end opened outwardly through a bolt entering hole 13 formed in the first supporting plate portion 6. A bolt 16 for attaching the grommet 3 to the carrying plate 4 is inserted into the outer cylinder 10 from the bolt entering hole 13 (refer to FIG. 9).

An engaging piece 14 and movable pieces 15 are formed as a part of a cylindrical wall of the outer cylinder 10. The engaging piece 14 is positioned at one end of the first supporting plate portion 6 in the longitudinal direction, and a latching portion 14*a* is provided on an upper portion of the engaging piece 14 (refer to FIG. 6). The movable pieces 15 are symmetrically disposed at both sides of the first supporting plate portion 6 in the width direction. The movable pieces 15 are integrally connected to other constituting portions of the outer cylinder 10 only at a projecting end of the outer cylinder 10, and have free ends at the base end of the outer cylinder 10, so that the movable pieces 15 can expand or contract. Each of the movable piece 15 has an inner surface inclined inwardly toward the first supporting plate portion 6 in the radial direction of the outer cylinder 10 (refer to FIGS. 3 and 7).

The annular depressed portion 11 is formed of a thin portion of the first supporting plate portion 6 around the outer cylinder 10. When the outer cylinder 10 is fitted in the hole 12 of the window glass 2, the first supporting plate portion 6 is positioned away from the peripheral edge portion of the hole 12 with the annular depressed portion 11, so that a force is not directly acted on the peripheral edge portion of the hole 12 from the first supporting plate portion 6 (refer to FIG. 9).

As shown in FIGS. 2 to 6 and 9, the connecting plate portion 7 is integrally connected to the other side of the first supporting plate portion 6 in the longitudinal direction. The connecting plate portion 7 allows the first supporting plate portion 6 to face the second supporting plate portion 8 when the second supporting plate portion 8 rotates with respect to the first supporting plate portion 6. With the connecting plate portion 7, it is possible to provide a predetermined space between the first and second supporting plate portions 6 and 8 for receiving the lower portion of the window glass 2. The space is suitably determined according to a thickness of the window glass 2.

Figure 3:
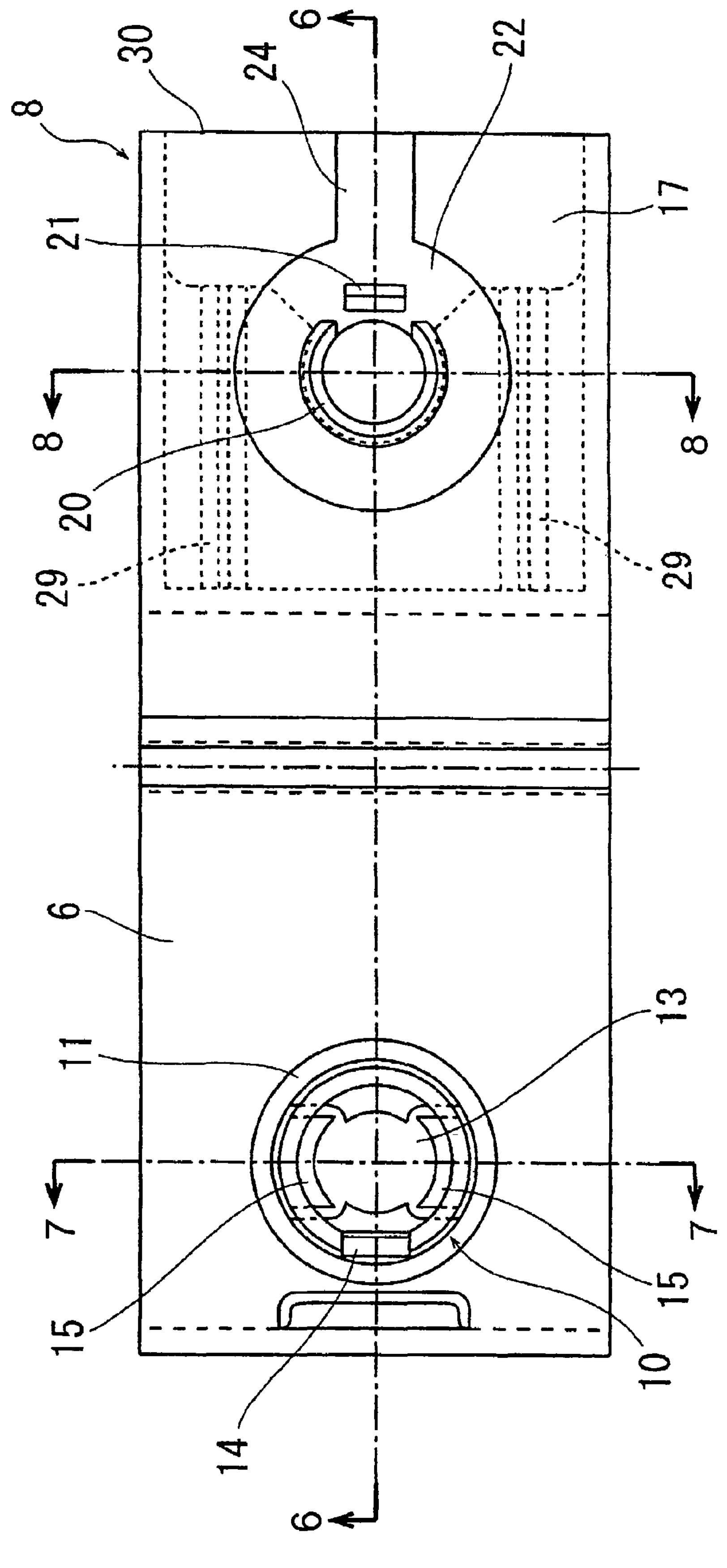
FIG. 3 is a plan view showing the grommet according to the first embodiment.
Figure 4:
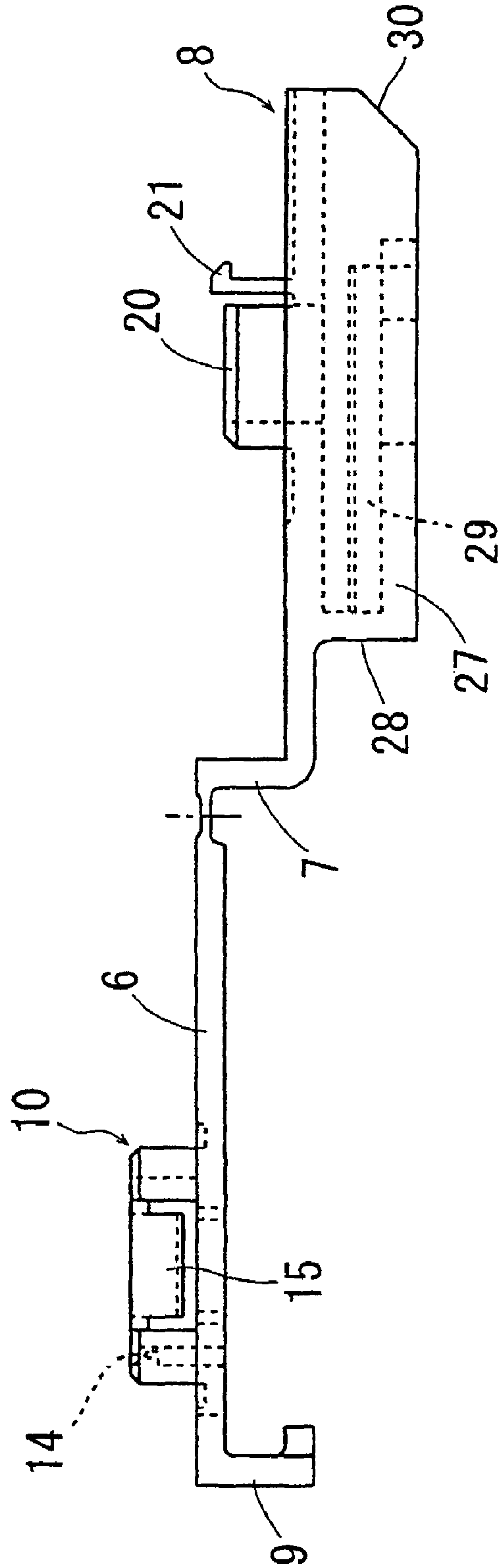
FIG. 4 is a front view showing the grommet according to the first embodiment.
Figure 5:
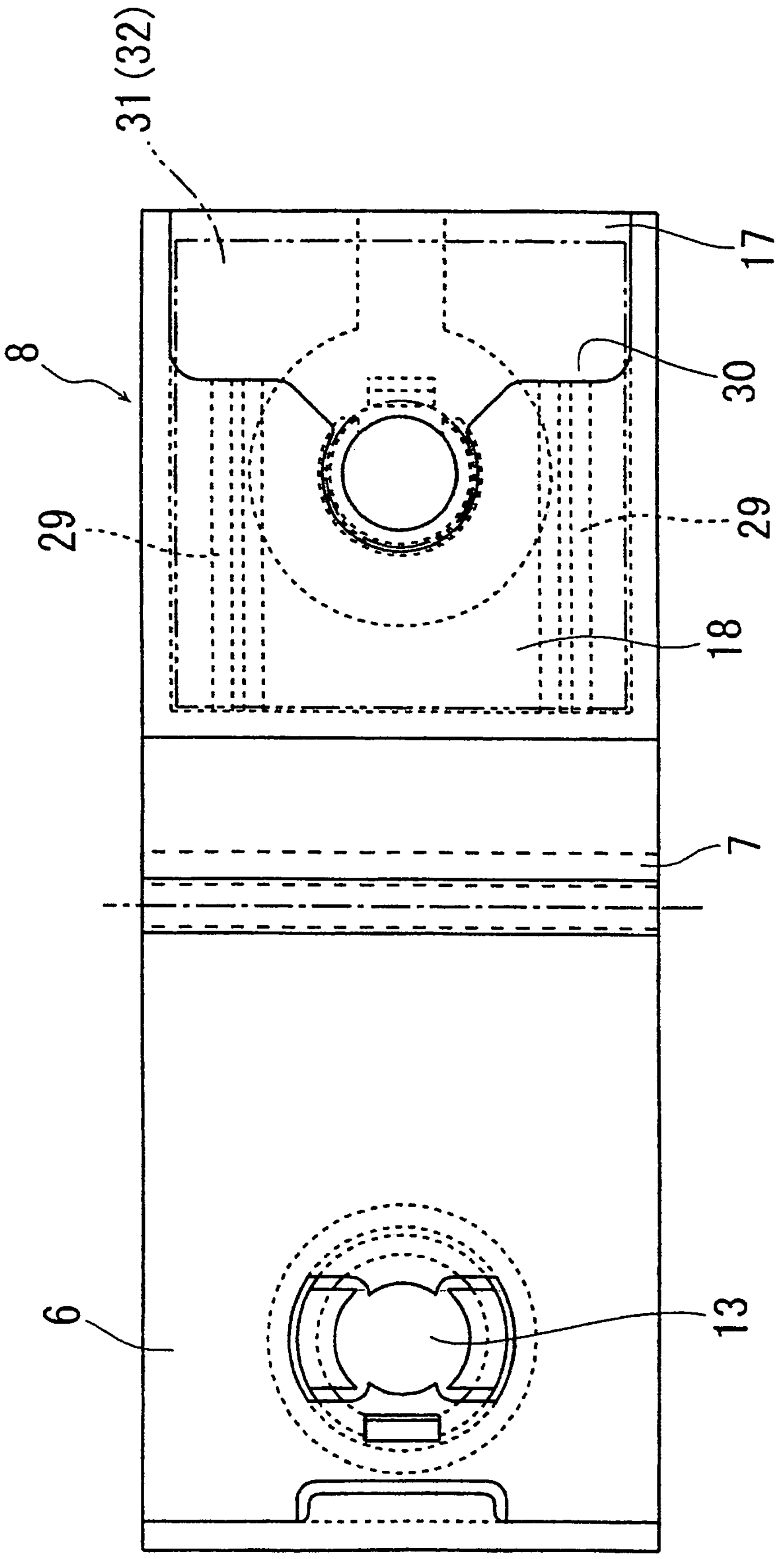
FIG. 5 is a bottom view showing the grommet according to the first embodiment.
Figure 6:
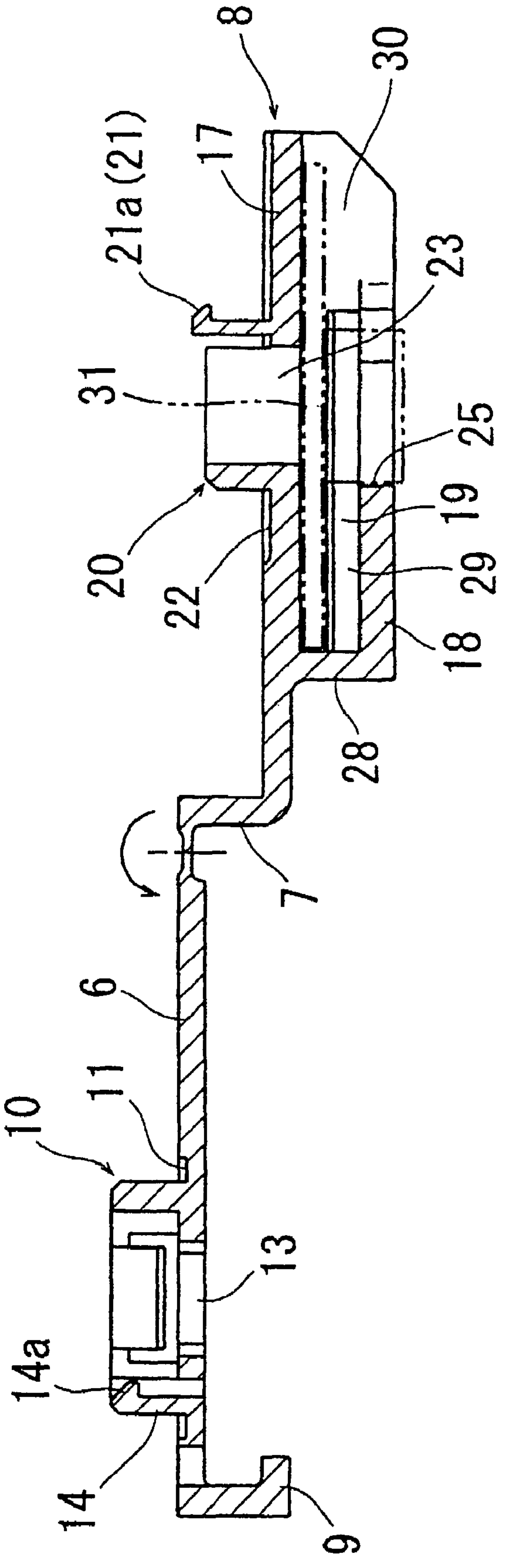
FIG. 6 is a sectional view taken along line 6-6 in FIG. 3.
Figure 7:
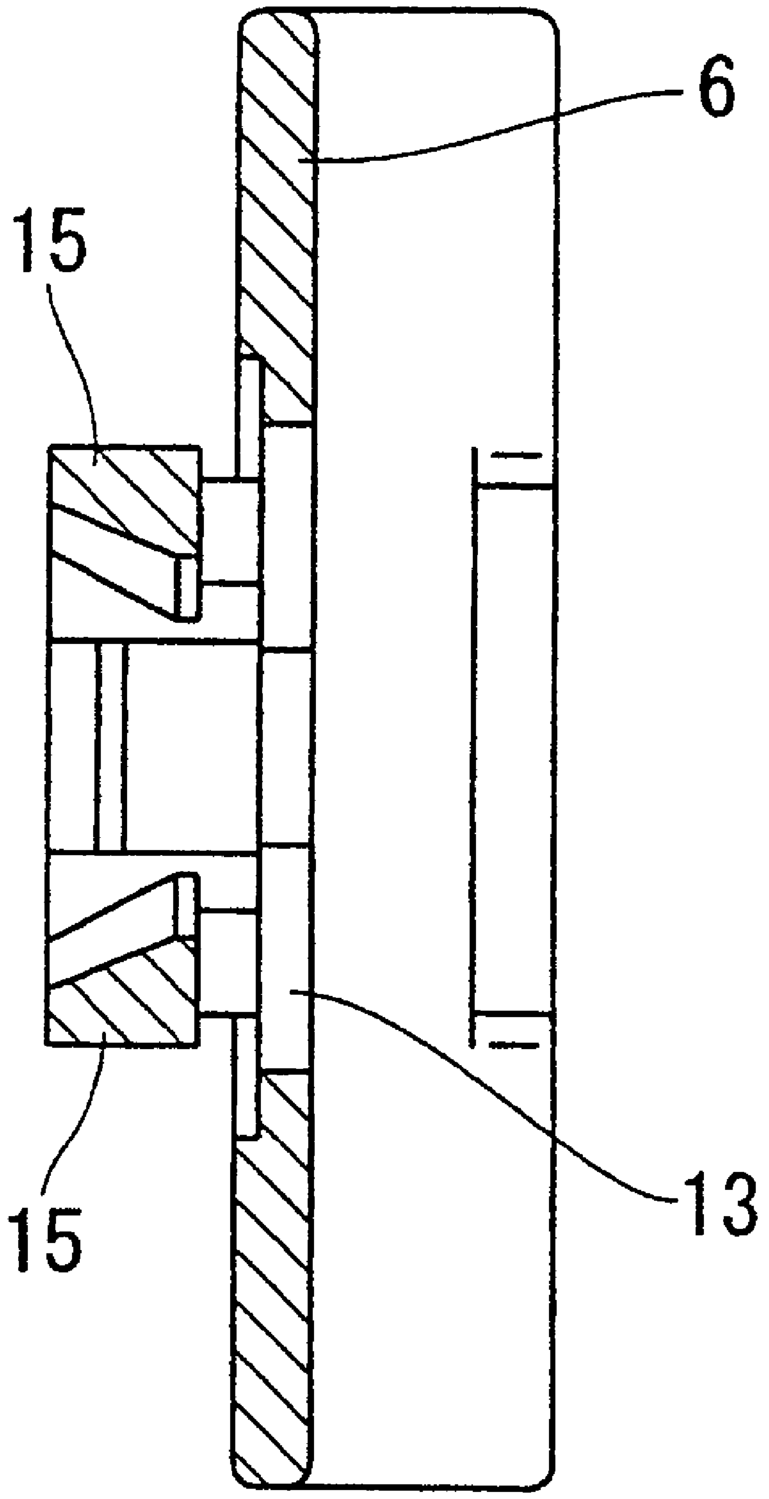
FIG. 7 is an enlarged sectional view taken along line 7-7 in FIG. 3.
Figure 8:
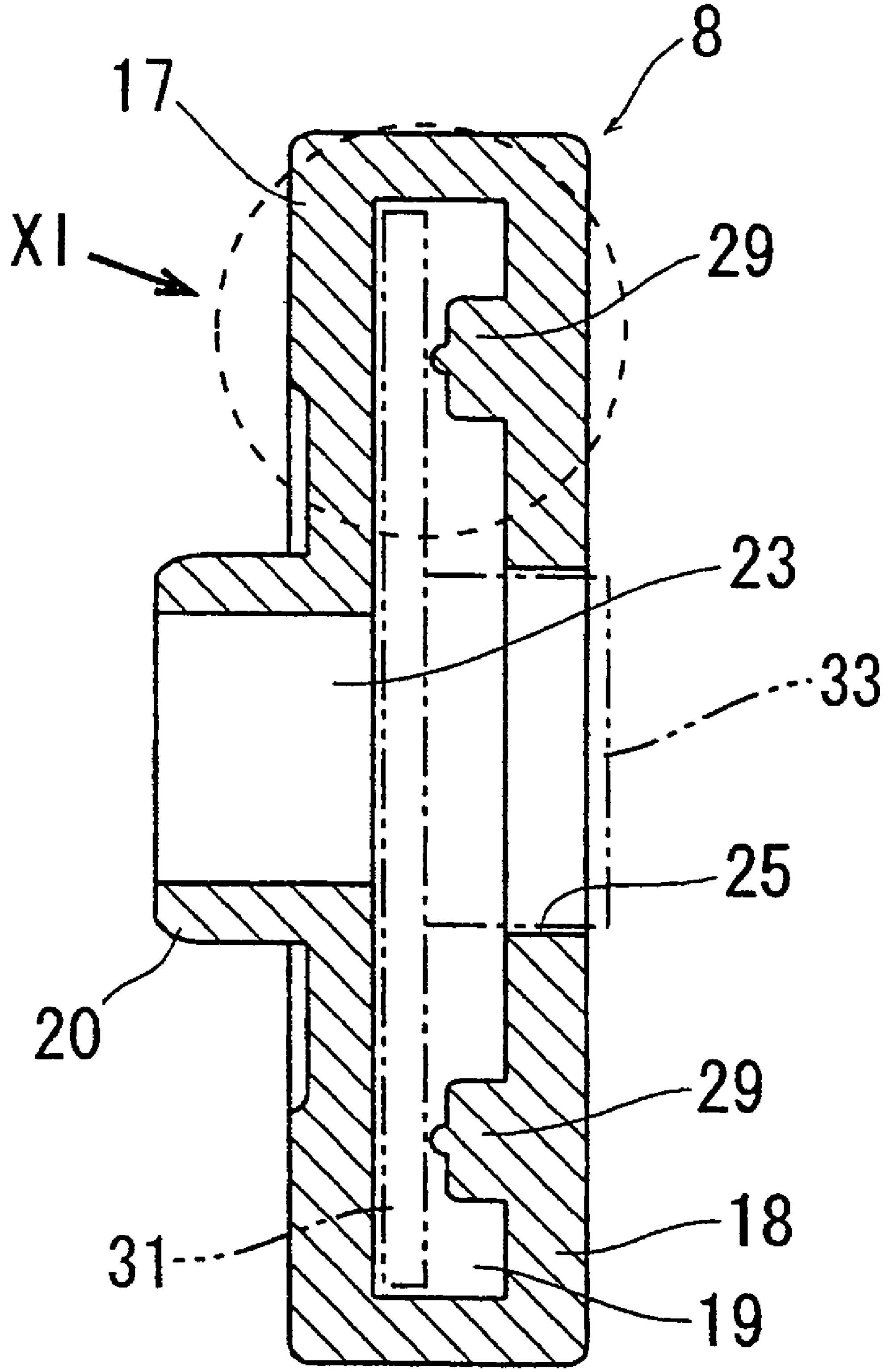
FIG. 8 is an enlarged sectional view taken along line 8-8 in FIG. 3.

As shown in FIGS. 2, 3 and 5, the second supporting plate portion 8 is formed in a rectangular shape corresponding to the first supporting plate portion 6 to hold the lower portion of the window glass 2. As shown in FIGS. 2 to 6 and 9, the second supporting plate portion 8 includes an inner plate portion 17 as an inner plate and an outer plate portion 18 as an outer plate facing the inner plate portion 17. A receiving space 19 is formed between the inner and outer plate portions 17 and 18.

The inner plate portion 17 of the second supporting plate portion 8 is connected to the connecting plate portion 7 at a substantially right angle at one end thereof in the longitudinal direction. As shown in FIGS. 2 to 4, 6 and 9, an inner surface of the inner plate portion 17 is provided with an inner cylinder (other cylinder) 20, an engaging piece 21 and an annular depressed portion 22. The inner cylinder 20 is positioned and has a size so that the inner cylinder 20 is fitted in the outer cylinder 10 of the first supporting plate portion 6 when the second supporting plate portion 8 rotates with respect to the first supporting plate portion 6 to face each other. When the inner cylinder 20 is fitted in the outer cylinder 10, the inner cylinder 20 pushes the movable pieces 15 of the outer cylinder 10 to open (refer to FIG. 10).

The inner cylinder 20 has at an opening at the projecting end thereof, and also has an opening at the base end thereof located in the receiving space 19 through the bolt exit 23 formed in the inner plate portion 17. Accordingly, in a state that the inner cylinder 20 is fitted in the outer cylinder 10, the bolt 16 can pass through the first supporting plate portion 6 and the inner plate portion 17 via the inner spaces of the inner cylinder 20 and the outer cylinder 10 to reach the receiving space 19.

As shown in FIGS. 2 to 4, 6 and 9, the engaging piece 21 of the second supporting plate portion 8 is disposed at a position closer to the other end of the second supporting plate portion 8 in the longitudinal direction than the other portions of the inner cylinder 20, and is formed of a part of the cylindrical wall of the inner cylinder 20. The engaging piece 21 is also provided with a latching portion 21*a* at a forward end thereof. When the inner cylinder 20 is fitted in the outer cylinder 10 and the first and second supporting plate portions 6 and 8 face each other, the engaging pieces 14 and 21 (latching portions 14*a*, 21*a*) of the first and second supporting plate portions 6 and 8 engage with each other. In the present embodiment, in a state that the first and second supporting plate portions 6 and 8 face each other, especially, in a state that the first and second supporting plate portions 6 and 8 are positioned in parallel to each other, the engaging pieces 14 and 21 engage with each other.

Figure 9:
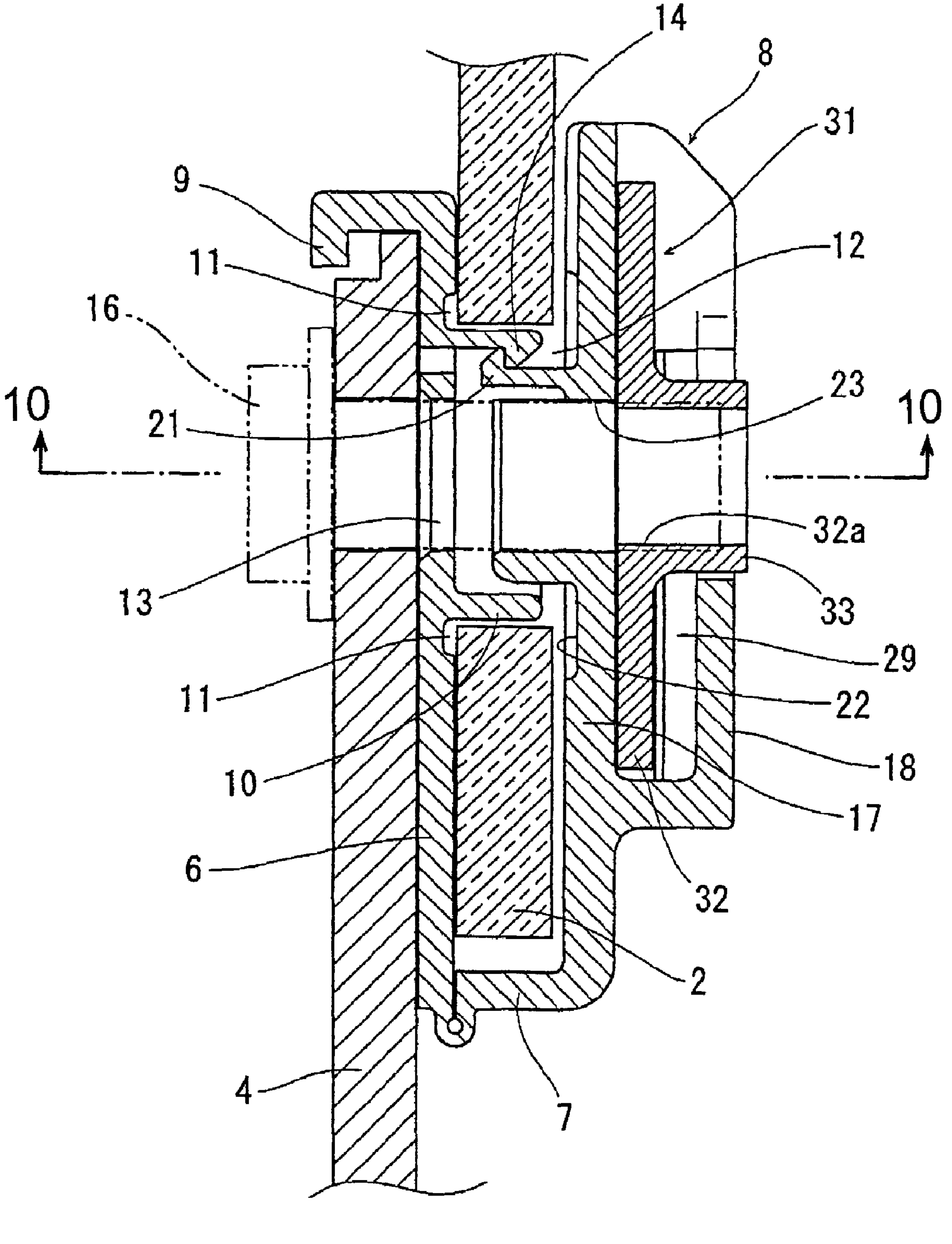
FIG. 9 is a vertical sectional view showing a state that a carrying plate is attached to a window glass with the grommet according to the first embodiment.

As shown in FIGS. 3 and 9, the annular depressed portion 22 of the second supporting plate portion 8 is formed of a thin portion of the second supporting plate portion 8 around the inner cylinder 20. When the inner cylinder 20 is fitted in the outer cylinder 10 in the hole 12 of the window glass 2, the annular depressed portion 22 separates the second supporting plate portion 8 from the peripheral edge portion of the hole 12, so that a force is not directly acted on the peripheral edge portion of the hole 12 from the second supporting plate portion 8. In the present embodiment, in addition to the annular depressed portion 22, a linear depressed portion 24 connected to the annular depressed portion 22 is formed in the inner surface of the second supporting plate portion 8, and extends toward the other end of the second supporting plate portion 8 in the longitudinal direction.

The outer plate portion 18 of the second supporting plate portion 8 forms the receiving space 19 with a flat shape (bag shape) together with a side wall portion 27 and a bottom wall portion 28 between the inner plate portion 17 and the outer plate portion 18. An inserting port 30 is formed at the other end of the outer plate portion 18 of the second supporting plate portion 8 as an opening of the receiving space 19. The outer plate portion 18 is provided with a loose fitting hole 25 facing the bolt exit 23 and a notch 26 for opening a portion of the loose fitting hole 25 with respect to the other end of the outer plate portion 18 in the longitudinal direction.

As shown in FIGS. 3 to 6 and 8 to 11, the outer plate portion 18 includes a pair of supporting portions 29 integrally formed in the receiving space 19 as supporting members. The supporting portions 29 project from both sides of the outer plate portion 18 in the widthwise direction to sandwich the loose fitting hole 25 therebetween, and extend in the longitudinal direction of the outer plate portion 18. Each of the supporting portions 29 includes a base portion **29*a* having a predetermined width and a forward end projection 29*b* having a smaller width on an upper surface of the base portion 29*a*. The base portion 29*a* and the forward end projection 29*b* are integrated in a specific shape and formed of a synthetic resin same as that of the outer plate portion 18, so that the base portion 29*a* and the forward end projection 29*b*** can deform such as compressive deformation.

Figure 12:
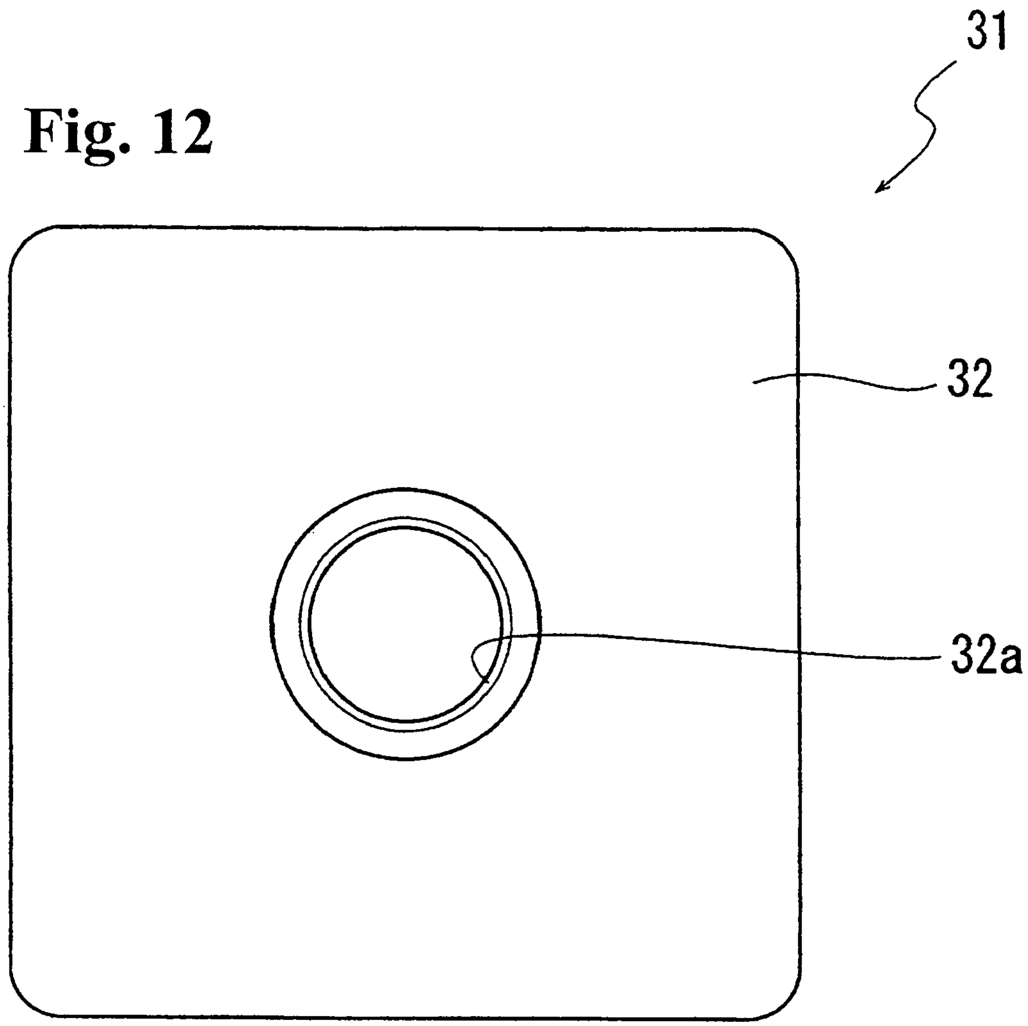
FIG. 12 is a front view showing a nut member according to the first embodiment.
Figure 13:
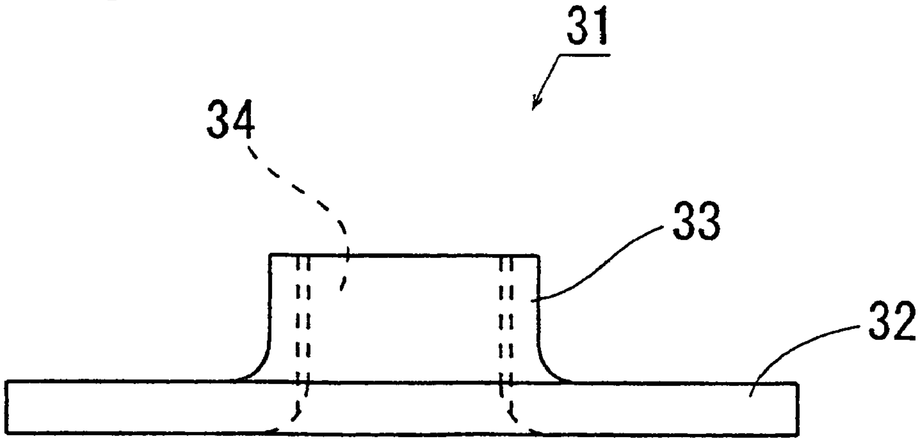
FIG. 13 is a plan view of the nut member shown in FIG. 12.

As shown in FIGS. 5, 6, 8 to 10, the receiving space 19 houses a nut member 31 therein. As shown in FIGS. 12 and 13, the nut member 31 is formed of an annular plate portion 32 and a cylindrical portion 33 connected to a peripheral edge portion of a central circular hole **32*a* of the annular plate portion 32. These portions are integrally formed of a rigid material (synthetic resin, metal or the like) stronger than that of the supporting portions 29. In the present embodiment, the annular plate portion 32 is formed in a plate piece with a square outer shape. The inner plate portion 17 and the supporting portions 29 hold the annular plate portion 32 in the receiving space 19 in a state that a side wall portion 27 and a bottom wall portion 28 restrict rotation of the annular plate portion 32** (rotation locked state).

When the annular plate portion 32 is set, the annular plate portion 32 is pushed into a space between the inner plate portion 17 and the pair of the supporting portions 29 through the inserting port 30. At this time, the supporting portions 29 are compressed and press the annular plate portion 32 against the inner plate portion 17 with an elastic force thereof, so that the annular plate portion 32 is precisely held in the receiving space 19.

The cylindrical portion 33 includes a female screw on an inner peripheral surface thereof over an entire length in the axis direction, so that the inner portion of the cylindrical portion 33 constitutes a female screw hole 34. Accordingly, when the bolt 16 is screwed in the female screw hole 34, it is possible to obtain a sufficient screwing-in length with respect to the bolt 16. When a central circular hole **32*a* of the annular plate portion 32 is set to face the bolt exit 23 of the inner plate portion 17, the cylindrical portion 33 is loosely fitted in the loose fitting hole 25. When the annular plate portion 32 is inserted into the receiving space, the cylindrical portion 33 is fitted in the loose fitting hole 25 through the notch 26** without interference.

A process of attaching the window glass 2 to the carrying plates 4 using the glass fixing grommets 3 will be described next. First, the fixing grommets 3 are temporarily attached to a lower portion of the window glass 2. In the temporal fixing, the first and second supporting plate portions hold the lower portion of the window glass 2 from the lower side thereof, and the outer cylinder 10 and the inner cylinder 20 are pushed in the hole 12 of the window glass 2 and fitted into each other. When the inner cylinder 20 is fitted into the outer cylinder 10, the first and second supporting plate portions 6 and 8 become in a parallel state, and the engaging pieces 14 and 21 of the first and second supporting plate portions 6 and 8 engage with each other. Accordingly, with the engagement, the first and second supporting plate portions 6 and 8 are not separated (opened), thereby temporarily fixing the grommets 3 to the lower portion of the window glass 2 (refer to FIG. 9).

Figure 10:
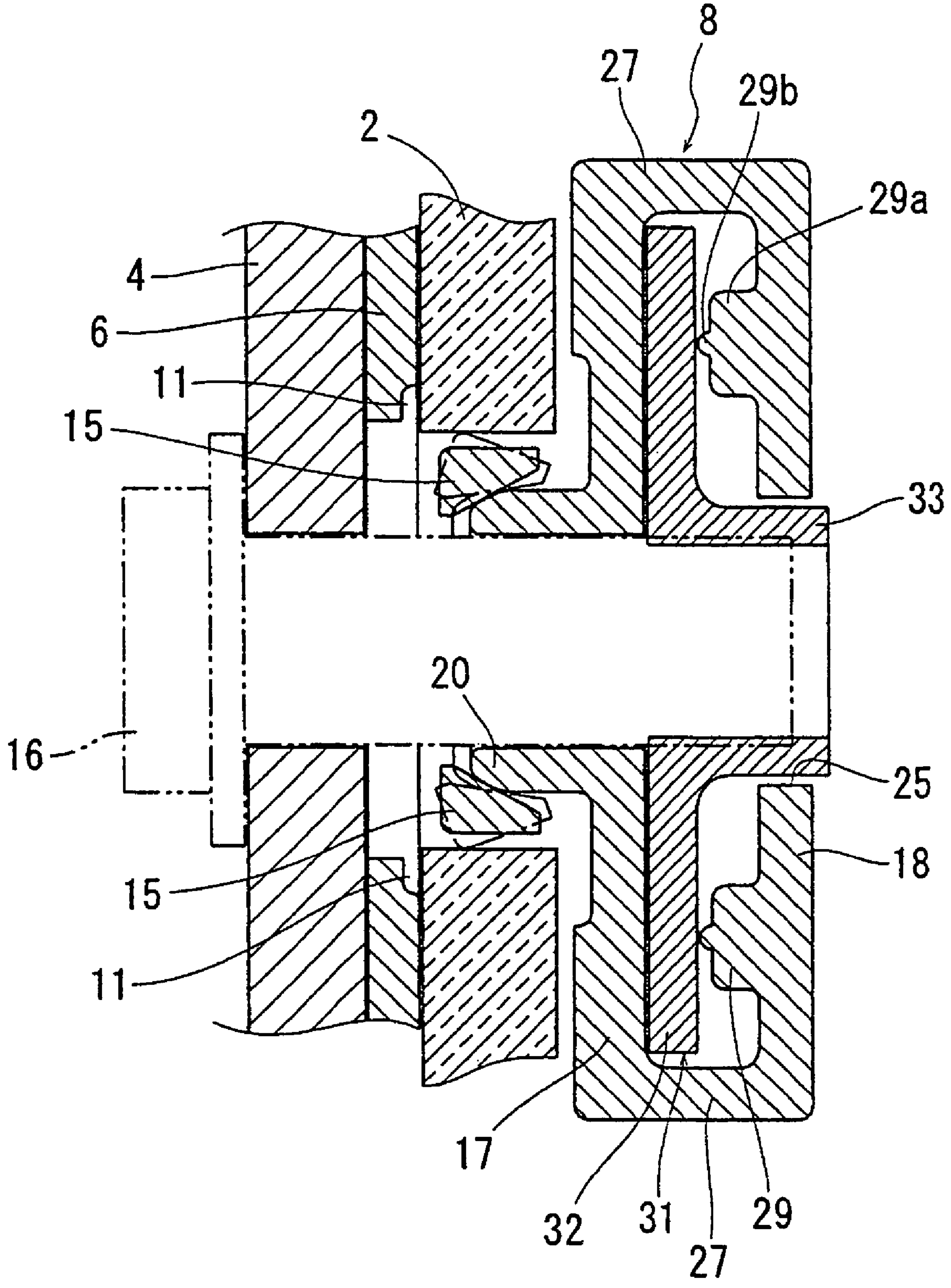
FIG. 10 is an enlarged sectional view taken long line 10-10 in FIG. 9.
Figure 11:
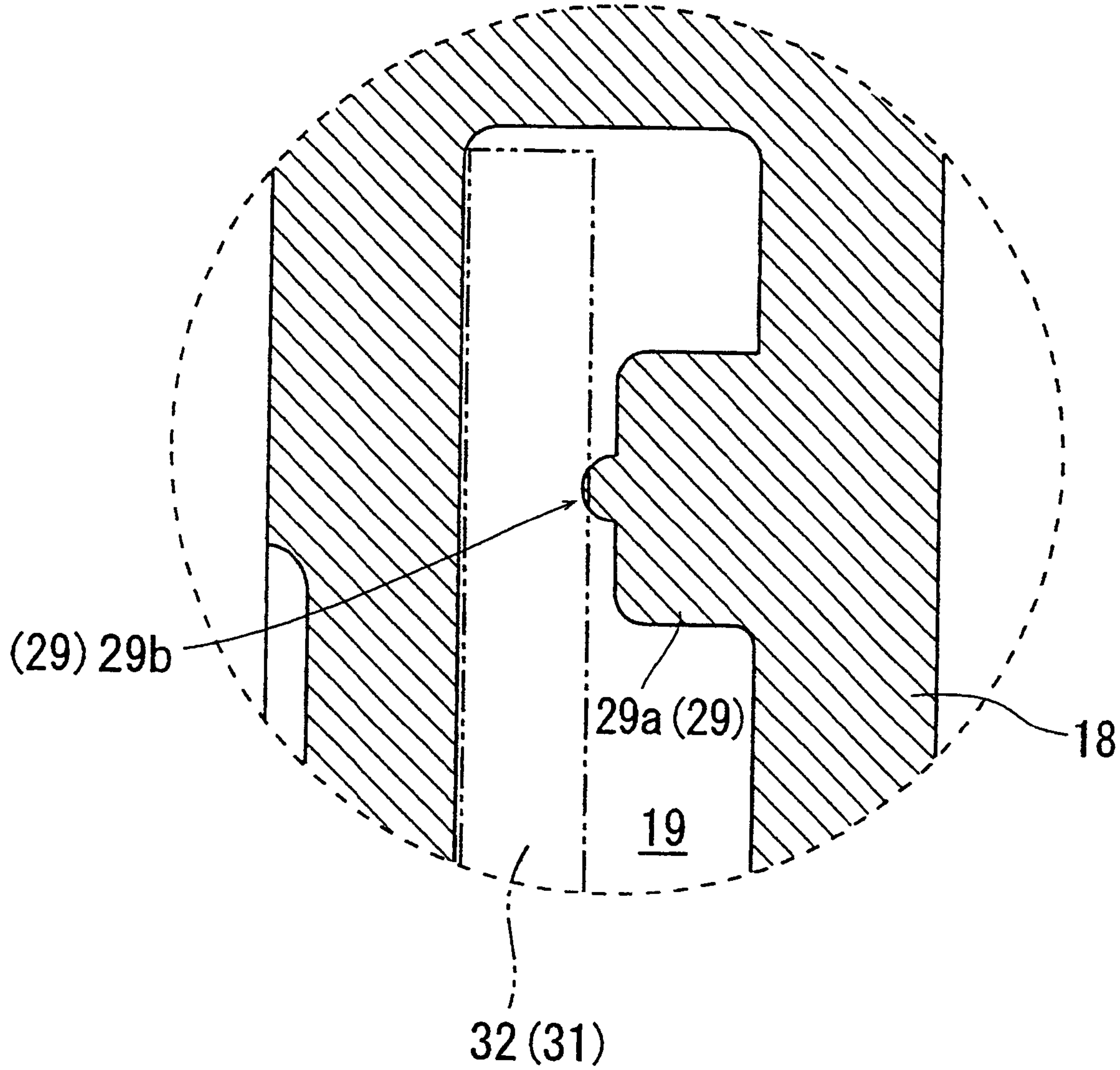
FIG. 11 is a partial enlarged view of FIG. 10.

As shown in FIG. 10, when the inner cylinder 20 is fitted into the outer cylinder 10, a pair of the movable pieces 15 is pushed to open outwardly in a radial direction of the outer cylinder 10, and abuts against an inner peripheral surface of the hole 12 of the window glass 2. Accordingly, even if the hole 12 of the window glass 2 has a variation in size, the axial centers of the inner and outer cylinders 20 and 10 are positioned at the center of the hole 12.

After the bolt 16 is inserted into the insertion hole 35 of the carrying plate 4 as a mount, the bolt 16 is further inserted into the inner and outer cylinders 20 and 10 in the fitted state through the bolt entering hole 13. Then, a forward end portion of the bolt 16 abuts against the female screw hole 34 of the nut member 31 through the bolt exit 23, and the bolt 16 is screwed in the female screw hole 34.

In this case, when the bolt 16 is screwed in the female screw hole 34 of the nut member 31, the bolt 16 pushes the nut member 31 in a direction that the nut member 31 is separated from the first supporting plate portion 6. However, the engaging pieces 14 and 21 of the first and second supporting plate portions 6 and 8 engage with each other and receive the pushing force. Accordingly, the axial center of the bolt 16 coincides with the axial center of the female screw hole 34, so that the bolt 16 is smoothly screwed in the nut member 31.

When the bolt 16 is screwed in the nut member 31, the second supporting plate portion 8 approaches the window glass 2 as the nut member 31 moves. Accordingly, the first and second supporting plate portions 6 and 8 hold the lower portion of the window glass 2, and the lower portion of the window glass 2 is attached to the carrying plates 4. This operation is completed when the tightening force of the bolt 16 reaches a predetermined level.

When the bolt 16 is screwed in the nut member 31, the bolt 16 is inserted into the inner and outer cylinders 20 and 10 in the fitted state, and the bolt 16 restricts the inner cylinder 20 to deform inwardly in a radial direction. Accordingly, the movable pieces 15 of the outer cylinder 10 are pushed outwardly in the radial direction of the inner cylinder 20, and held in a state abutting against the inner periphery of the hole 12 of the window glass 2, so that the grommets 3 are firmly fixed to the window glass 2.

When the grommet 3 is used, the bolt 16 is screwed in the nut member 31 provided in the grommet 3. Accordingly, it is possible to increase the tightening force as compared with a case where a tapping screw is directly screwed in the second supporting plate portion or the like. As a result, the grommets 3 are stably attached to the carrying plates 4 without loosening for a long period of time. Further, the nut member 31 is provided in the grommet 3, and the bolt 16 is screwed in the nut member 31. Accordingly, it is possible to reuse the grommet 3 as the bolt 16 is detachable from the nut member 31.

Figure 14:
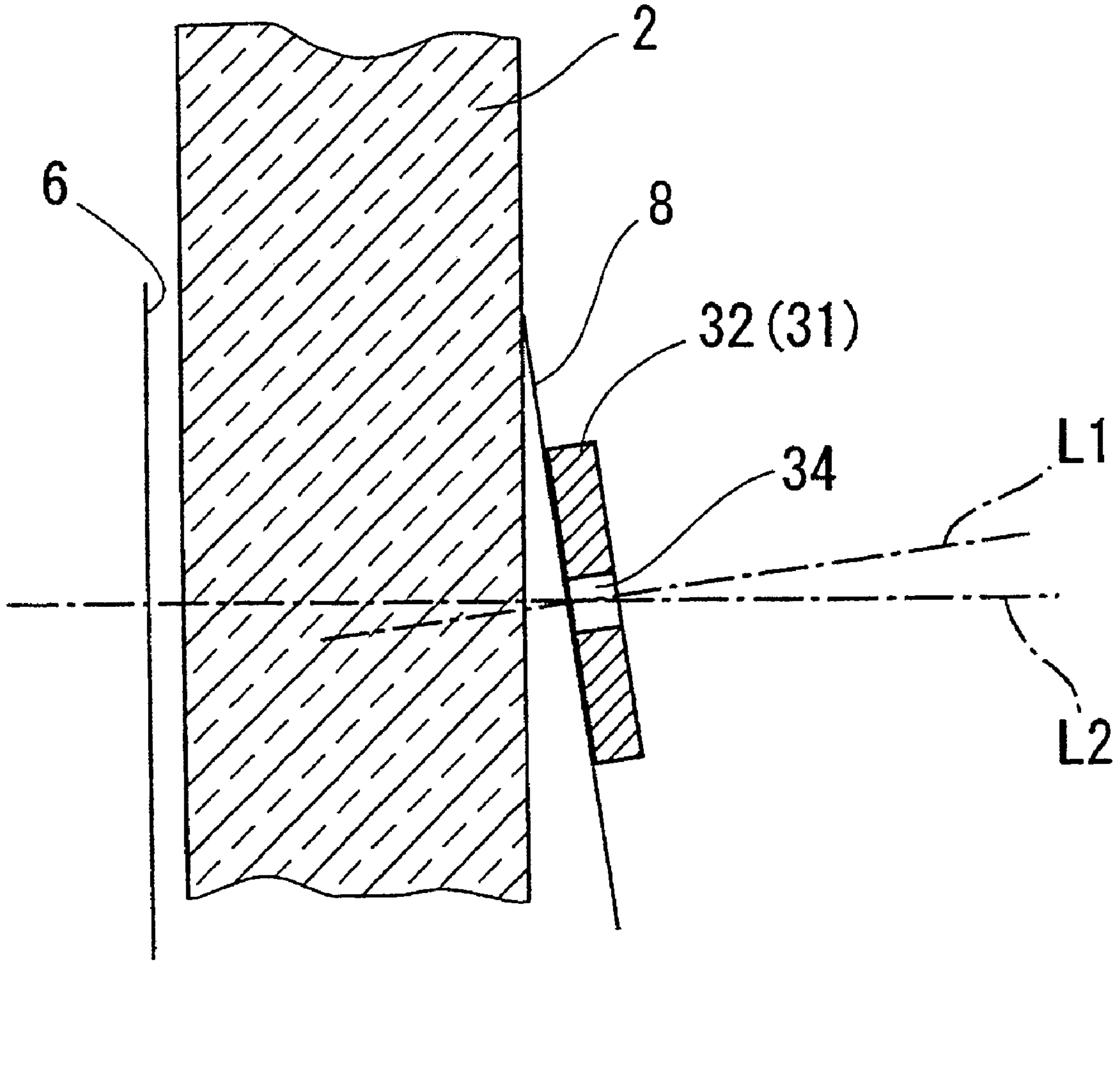
FIG. 14 is an explanatory view for explaining a case that a window glass has a small thickness and the nut member is fixed to a second supporting plate portion.

In the grommet 3, when the window glass 2 has a specific thickness, the first and second supporting plate portions 6 and 8 become a parallel state when the first and second supporting plate portions 6 and 8 hold the window glass 2. Further, the grommet 3 of the invention is applicable to a case that the window glass 2 has a thickness smaller than the specific thickness due to a variation. That is, in such a case (the window glass 2 has a thickness smaller than the specific thickness), when the second supporting plate portion 8 can bend in a certain degree, even if the nut member 31 is fixed to the second supporting plate portion 8, the first and second supporting plate portions 6 and 8 can hold the lower portion of the window glass 2 with the bolt 16 screwed in the nut member 31. However, in a case that the second supporting plate portion 8 does not bend and the nut member 31 is fixed to the second supporting plate portion 8, when the bolt 16 is screwed in the nut member 31 and the first and second supporting plate portions 6 and 8 hold the lower portion of the window glass 2, a portion of the second supporting plate portion 8 at a position further away from a rotational center thereof has a longer moving path as shown in FIG. 14. Accordingly, when the second supporting plate portion 8 rotates, the second supporting plate portion 8 is inclined toward the first supporting plate portion 6. As a result, an axial center L1 of the female screw hole 34 of the nut member 31 is inclined with respect to an axial center L2 of the bolt 16, thereby making it difficult to screw the bolt 16 in the nut member 31.

Figure 15:
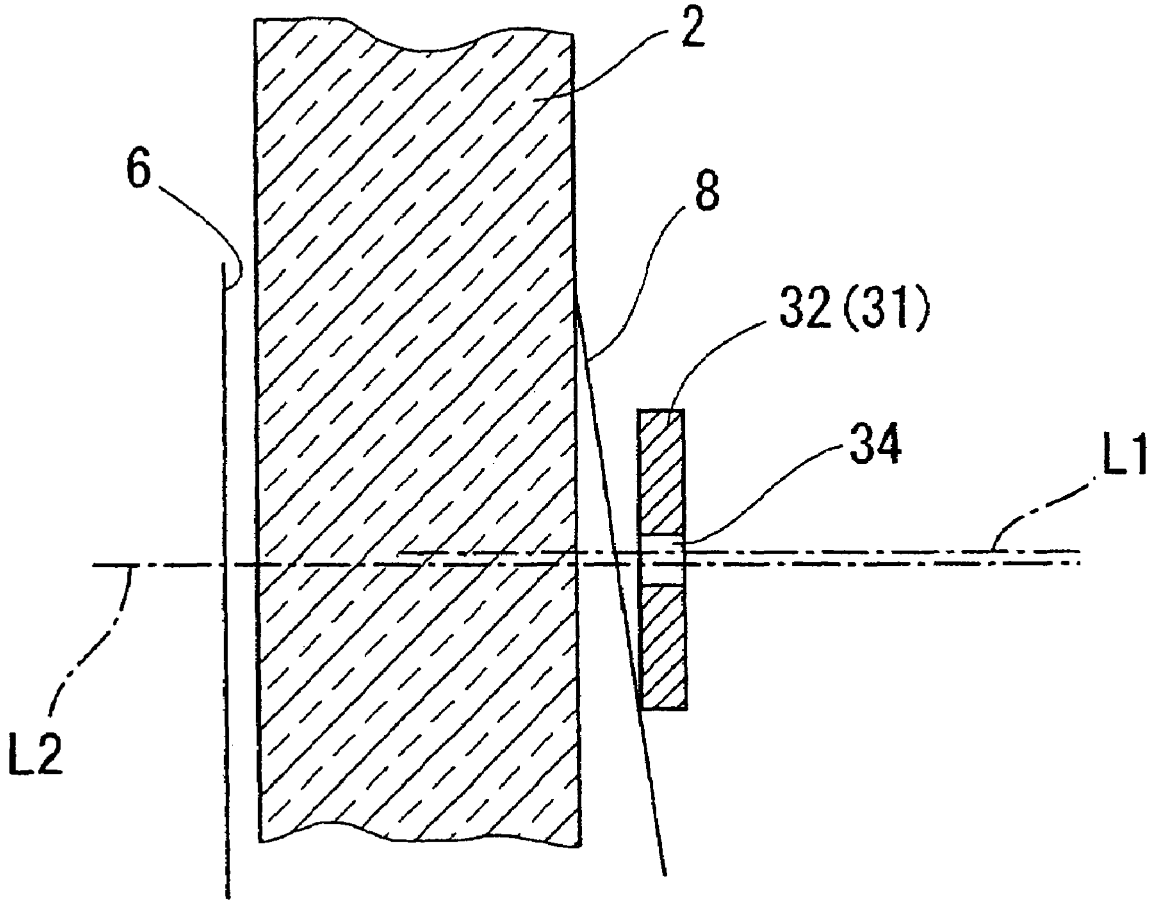
FIG. 15 is an explanatory view for explaining the case that the window glass has a small thickness.
Figure 16:
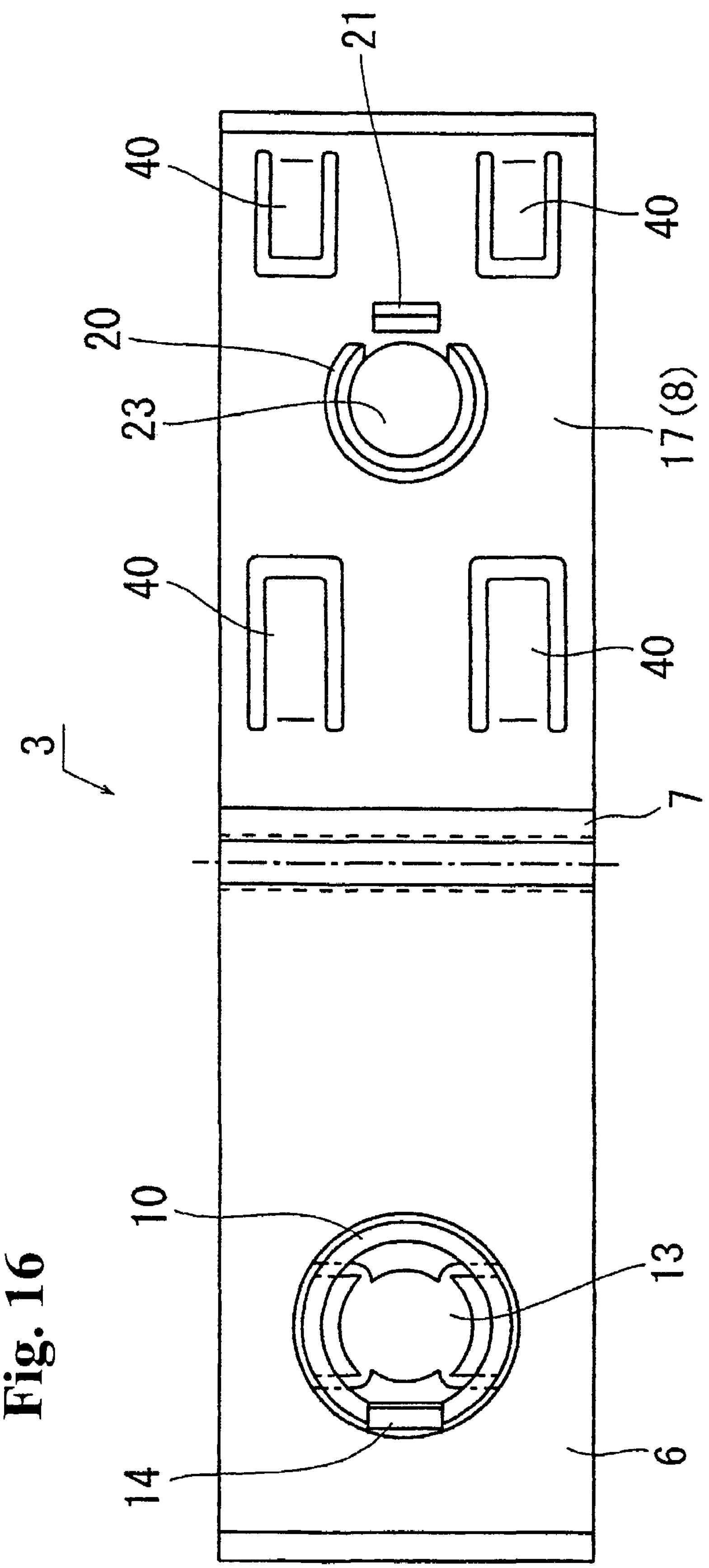
FIG. 16 is a plan view showing a grommet according to a second embodiment of the present invention.
Figure 17:
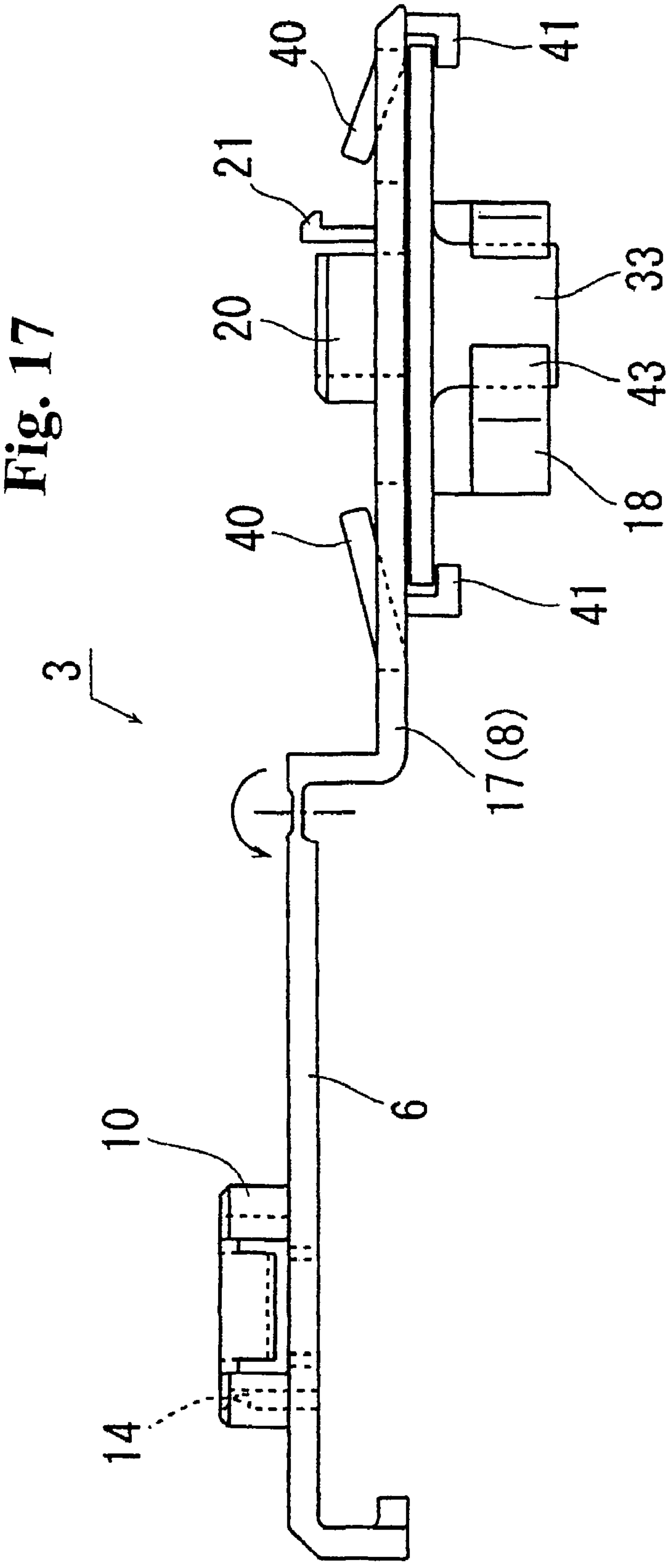
FIG. 17 is a front view showing the grommet according to the second embodiment.
Figure 18:
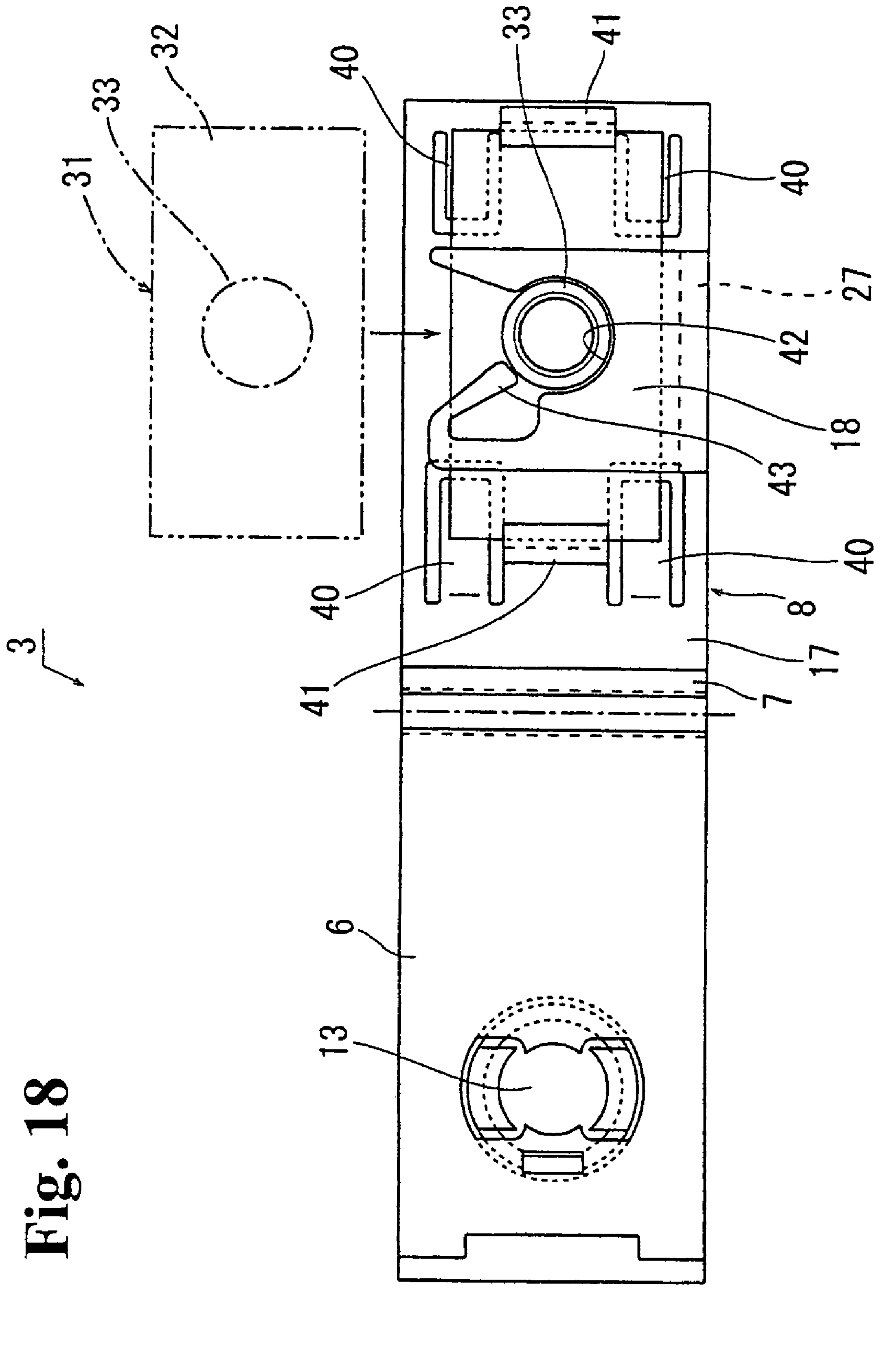
FIG. 18 is a bottom view showing the grommet according to the second embodiment.
Figure 19:
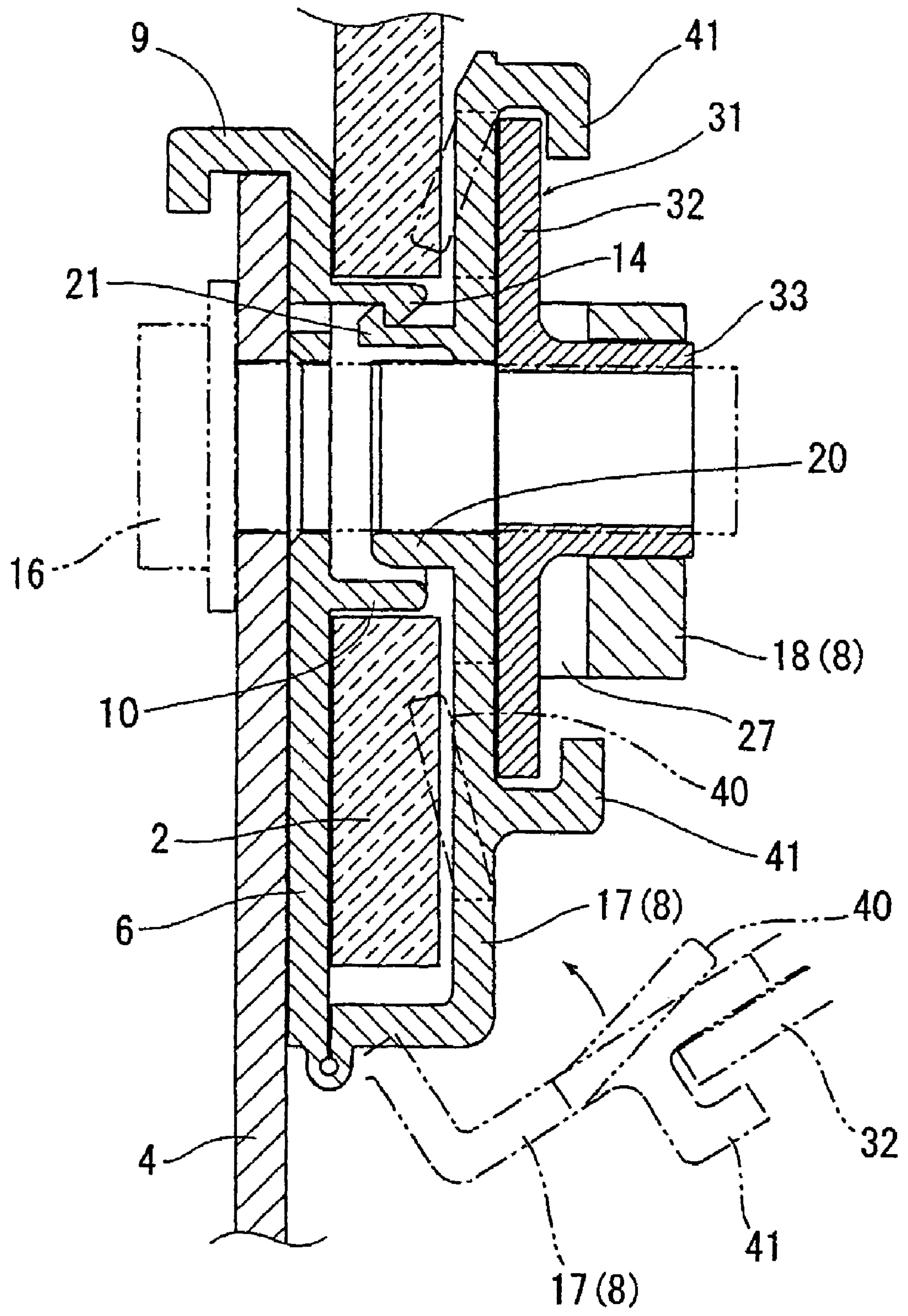
FIG. 19 is a vertical sectional view showing a state that a carrying plate is attached to a window glass with the grommet according to the second embodiment.

In the grommet 3 of the invention, the inner plate portion 17 and the supporting portions 29 hold the annular plate portion 32 of the nut member 31. When the second supporting plate portion 8 rotates toward the window glass 2 and the bolt 16 is screwed in the nut member 31, as shown in FIG. 15, the annular plate portion 32 presses a portion of the second supporting plate portion 8 with a shorter moving path (lower portion of the second supporting plate portion 8 shown in FIG. 15). The annular plate portion 32 does not press a portion of the second supporting plate portion 8 with a longer moving path (upper portion of the second supporting plate portion 8 in FIG. 15). Accordingly, in the case that the second supporting plate portion 8 does not deform (high rigidity), when the grommets 3 are used for fixing the window glass 2 with a thickness thinner than the specific thickness, it is possible to precisely hold the lower portion of the window glass 2 with the first and second supporting plate portions 6 and 8 when the both 16 is screwed in the nut member 31.

FIGS. 16 to 19 are views showing a grommet according to another embodiment. In the present embodiment, elements same as those in the aforementioned embodiment are designated by the same reference numerals and explanations thereof are omitted.

In the present embodiment, an inner plate portion 17 is provided with a plurality of elastic pieces 40 projecting inwardly. The elastic pieces 40 deform to provide a spring function and four elastic pieces having a rectangular shape are disposed in the vicinity of corners of the inner plate portion 17. A pair of holding rails 41 with a space therebetween is provided on an outer surface of the inner plate portion 17 in the longitudinal direction thereof, and the annular plate portion 32 of the nut member 31 is slidably disposed in the holding rails 41.

In the present embodiment, one side wall portion 27 is provided for supporting the outer plate portion 18 in a one-side state. The outer plate portion 18 includes a positioning hole 42 for positioning a cylindrical portion 33, and the positioning hole 42 has an opening opened outwardly through the notch 26 at one side of the outer plate portion 18 in the widthwise direction. Further, the outer plate portion 18 includes a movable regulating piece 43 in the vicinity of the notch 26. When the cylindrical portion 33 enters, the regulating piece 43 bends, and once the cylindrical portion 33 is fitted in the positioning hole 42, the regulating piece 43 restrict the cylindrical portion 33 not to move outwardly toward one side in the widthwise direction.

In the embodiment, when the annular plate portion 32 of the nut member 31 is fitted in the holding rails 41, and the cylindrical portion 33 is inserted into the notch portion 26 to slide toward the other side of the inner plate portion 17 in the widthwise direction, the female screw hole 34 of the nut member 31 is properly positioned with respect to the bolt exit 23 of the inner plate portion 17, and the inner plate portion 17 properly holds the nut member 31.

When the grommet 3 described above is used for fixing the window glass 2, it is possible to obtain advantages same as those in the embodiment described previously. When the window glass 2 has a thickness smaller than the intended thickness due to a variation, a type of glass or the like, the elastic pieces 40 abut against the window glass 2 to thereby prevent wobbling, and the first and second supporting plate portions 6 and 8 hold the lower portion of the window glass 2 with an adequate holding force.

Incidentally, the invention is not limited to the embodiments described above, and includes other modifications having practical preference and advantages.

The disclosure of Japanese Patent Application No. 2003-330443, filed on Sep. 22, 2003, is incorporated in the application.

While the invention has been explained with reference to the specific embodiments of the invention, the explanation is illustrative and the invention is limited only by the appended claims.

What is claimed is:

1. A glass fixing grommet for fixing a glass with a hole to a mount, comprising:

a first supporting plate to be attached on one surface of the glass and having a first cylinder portion with a bolt inserting hole for inserting a bolt therein, a second supporting plate to be attached on the other surface of the glass to face the first supporting plate, said second supporting plate having a second cylinder portion with a bolt exit to be fitted with the first cylinder portion, and a nut holding member situated adjacent to the bolt exit for holding a nut thereat, said first cylinder portion being fitted with the second cylinder portion in the hole of the glass in a state that the first supporting plate and the second supporting plate sandwich the glass to allow the bolt passing through the mount and the first and second supporting plates to engage the nut to fix the glass to the mount, and a connecting plate pivotally connecting said first and second supporting plates, wherein said second supporting plate includes an outer plate portion to form a space as the nut holding member inside the outer plate portion, said space having a size so that a posture of the nut can be changed with respect to the second supporting plate, and said second supporting plate includes an inner plate facing the outer plate to form the nut holding member for receiving the nut in the space between the inner and outer plates, and a deformable supporting member formed at the outer plate facing the inner plate.

2. A glass fixing grommet as claimed in claim 1, wherein said first and second supporting plates include engaging pieces for regulating a space between the first and second supporting plates, said engaging pieces engaging with each other when the first cylinder portion is fitted in the second cylinder portion.

3. A glass fixing grommet as claimed in claim 2, wherein said engaging pieces engage with each other in a state that the first and second supporting plates become parallel.

4. A glass fixing grommet as claimed in claim 1, wherein said outer plate includes a portion for loosely receiving the nut.

5. A glass fixing grommet as claimed in claim 1, wherein said second supporting plate further includes an inserting port between the inner plate and the outer plate for inserting an annular plate portion of the nut, said outer plate having a notch for allowing a cylindrical portion of the nut to enter when the annular plate portion is inserted into the inserting port.

6. A glass fixing grommet as claimed in claim 1, wherein said outer plate includes a loose fitting hole at a position corresponding to the bolt exit, two lateral sides, and upper and bottom sides, said two lateral sides and bottom side being entirely connected to those of the inner plate corresponding thereto to form the space for the nut holding member, and said upper side forming an inserting port between the inner plate and the outer plate for inserting the nut.

7. A glass fixing grommet for fixing a glass with a hole to a mount, comprising:

a first supporting plate to be attached on one surface of the glass and having a first cylinder portion with a bolt inserting hole for inserting a bolt therein, and a second supporting plate to be attached on the other surface of the glass to face the first supporting plate, said second supporting plate having a second cylinder portion with a bolt exit to be fitted with the first cylinder portion, and a nut holding member situated adjacent to the bolt exit for holding a nut thereat, said first cylinder portion being fitted with the second cylinder portion in the hole of the glass in a state that the first supporting plate and the second supporting plate sandwich the glass to allow the bolt passing through the mount and the first and second supporting plates to engage the nut to fix the glass to the mount, wherein one of said first and second cylinders is located outside the other of the first and second cylinders to form outer and inner cylinders respectively, and includes a movable piece on a cylindrical wall of the outer cylinder, said movable piece having a base end pivotally connected to the cylindrical wall of the outer cylinder and an inner surface inclined inwardly toward the base end of the cylindrical wall, said movable piece contacting the inner cylinder when the first and second cylinders are assembled.

8. A glass fixing grommet for fixing a glass with a hole to a mount, comprising:

a first supporting plate to be attached on one surface of the glass and having a first cylinder portion with a bolt inserting hole for inserting a bolt therein, and a second supporting plate to be attached on the other surface of the glass to face the first supporting plate, said second supporting plate having a second cylinder portion with a bolt exit to be fitted with the first cylinder portion, and a nut holding member situated adjacent to the bolt exit for holding a nut thereat, said first cylinder portion being fitted with the second cylinder portion in the hole of the glass in a state that the first supporting plate and the second supporting plate sandwich the glass to allow the bolt passing through the mount and the first and second supporting plates to engage the nut to fix the glass to the mount, wherein at least one of said first and second supporting plates includes an annular depressed portion around the cylinder portion thereof so that an edge portion of the hole of the glass does not contact the glass fixing grommet when the glass fixing grommet fixes the glass to the mount.

9. A glass fixing grommet as claimed in claim 8, wherein said first and second supporting plates include the annular depressed portions around the respective cylinder portions.

10. A glass fixing grommet for fixing a glass with a hole to a mount, comprising:

a first supporting plate to be attached on one surface of the glass and having a first cylinder portion with a bolt inserting hole for inserting a bolt therein, and a second supporting plate to be attached on the other surface of the glass to face the first supporting plate, said second supporting plate having a second cylinder portion with a bolt exit to be fitted with the first cylinder portion, and a nut holding member situated adjacent to the bolt exit for holding a nut thereat, said first cylinder portion being fitted with the second cylinder portion in the hole of the glass in a state that the first supporting plate and the second supporting plate sandwich the glass to allow the bolt passing through the mount and the first and second supporting plates to engage the nut to fix the glass to the mount, wherein said first supporting plate is rotatably connected to the second supporting plate through a connecting plate, one of said first and second supporting plates having an elastic piece partially projecting inwardly therefrom for elastically abutting against the glass at an inner side thereof when the glass fixing grommet is fixed to the glass.

11. A glass fixing grommet as claimed in claim 10, wherein said elastic piece is a part of the first or second supporting plate inclined inwardly relative to the first or second supporting plate.

* * * * *